(12) United States Patent
Oehmichen

(10) Patent No.: US 12,180,055 B2
(45) Date of Patent: Dec. 31, 2024

(54) METHOD AND DEVICE FOR HOT-FILLING A LIQUID PRODUCT

(71) Applicant: Krones AG, Neutraubling (DE)

(72) Inventor: Thomas Oehmichen, Regensburg (DE)

(73) Assignee: Krones AG, Neutraubling (DE)

( * ) Notice: Subject to any disclaimer, the term of this patent is extended or adjusted under 35 U.S.C. 154(b) by 140 days.

(21) Appl. No.: 17/763,077

(22) PCT Filed: Aug. 21, 2020

(86) PCT No.: PCT/EP2020/073472
§ 371 (c)(1),
(2) Date: Mar. 23, 2022

(87) PCT Pub. No.: WO2021/069136
PCT Pub. Date: Apr. 15, 2021

(65) Prior Publication Data
US 2022/0371872 A1   Nov. 24, 2022

(30) Foreign Application Priority Data
Oct. 8, 2019 (DE) .......................... 102019126946.6

(51) Int. Cl.
*B67C 3/04* (2006.01)
*B67C 3/22* (2006.01)

(52) U.S. Cl.
CPC ................ *B67C 3/045* (2013.01); *B67C 3/22* (2013.01); *B67C 2003/226* (2013.01)

(58) Field of Classification Search
CPC ..... B67C 3/045; B67C 3/22; B67C 2003/226; A23L 2/46

(Continued)

(56) References Cited

U.S. PATENT DOCUMENTS 1,094,380 A * 4/1914 Tait ........................... A23L 2/46
426/409
3,254,943 A * 6/1966 Palm ........................ A23L 2/46
99/468

(Continued)

FOREIGN PATENT DOCUMENTS

CA     2545868 A1    11/2006
CN     1738762 A     2/2006

(Continued)

OTHER PUBLICATIONS

International Search Report for International Application No. PCT/EP2020/073472 dated Nov. 26, 2020, with English translation, 5 pages.

(Continued)

*Primary Examiner* — Stephen F. Gerrity
(74) *Attorney, Agent, or Firm* — Lowenstein Sandler LLP

(57) ABSTRACT

A method and a device for hot-filling a liquid product with a flash pasteurizer comprising a first and a second heat exchanger, a filling station, a cooling tunnel for cooling filled containers, and a heat pump. Prior to the filling process, the product is heated to a target temperature in the flash pasteurizer. Coolant is conducted from the cooling tunnel to the second heat exchanger, so that at least a part of the thermal energy of the coolant can be transferred to the product. The product is then conducted from the first to the second heat exchanger, wherein a further part of the thermal energy can be transferred to the second heat exchanger by the heat pump using a heat transfer medium to heat the product to the target temperature. The heat transfer medium is additionally heated by a heater arranged between the heat pump and the second heat exchanger.

19 Claims, 3 Drawing Sheets

(58) Field of Classification Search
USPC .................................................. 53/440, 127
See application file for complete search history.

(56) References Cited

U.S. PATENT DOCUMENTS

| | | | | |
|---|---|---|---|---|
| 3,451,471 | A * | 6/1969 | Palm .................... | A23L 3/22 |
| | | | | 165/66 |
| 4,610,298 | A * | 9/1986 | van Schagen et al. ... | A23L 3/18 |
| | | | | 165/909 |
| 9,295,279 | B2 * | 3/2016 | Cadeo .................... | A23L 3/00 |
| 2006/0137761 | A1 | 6/2006 | Takeda | |
| 2006/0286261 | A1 | 12/2006 | Wu | |
| 2009/0004349 | A1 * | 1/2009 | Dhruv et al. ........... | A23L 3/362 |
| | | | | 165/104.19 |
| 2010/0139214 | A1 | 6/2010 | Schulz | |
| 2011/0225932 | A1 | 9/2011 | Hirdina | |
| 2012/0288603 | A1 | 11/2012 | Weinzierl | |
| 2012/0312419 | A1 | 12/2012 | Wagner et al. | |
| 2013/0059055 | A1 * | 3/2013 | Richter et al. ............ | A23L 2/46 |
| | | | | 99/483 |
| 2014/0116674 | A1 * | 5/2014 | Wagner et al. ......... | A23L 3/362 |
| | | | | 165/295 |
| 2019/0069581 | A1 | 3/2019 | Feilner | |
| 2019/0230963 | A1 | 8/2019 | Runge | |

FOREIGN PATENT DOCUMENTS

| | | | | |
|---|---|---|---|---|
| CN | 101734591 | A | 6/2010 | |
| CN | 102190099 | A | 9/2011 | |
| CN | 102815421 | A | 12/2012 | |
| CN | 109422223 | A | 3/2019 | |
| CN | 109843782 | A | 6/2019 | |
| CN | 110294445 | A * | 10/2019 | ............... B67C 3/22 |
| DE | 102005053005 | A1 | 5/2007 | |
| DE | 102013112398 | A1 | 5/2015 | |
| EP | 2532247 | B1 | 1/2014 | |
| EP | 3057442 | B1 | 3/2017 | |
| JP | 2007202446 | A * | 8/2007 | ........... Y02A 30/274 |
| JP | 2007202446 | A2 | 8/2007 | |

OTHER PUBLICATIONS

English machine translation of Chinese office action for Chinese Patent Application No. 202080070602.8 dated Feb. 3, 2023, 7 pages.

\* cited by examiner

METHOD AND DEVICE FOR HOT-FILLING
A LIQUID PRODUCT

RELATED APPLICATIONS

This application claims the benefit of International Application No. PCT/EP2020/073472, filed Aug. 21, 2020, which claims priority to German Application No. DE102019126946.6, filed Oct. 8, 2019. The entire contents of both applications are hereby incorporated by reference.

TECHNICAL FIELD

The present invention relates to a method for hot-filling a liquid product and a device for hot-filling a liquid product.

BACKGROUND

EP 2 532 247 B1 discloses a method and a device for hot-filling liquids, in particular juices, having a flash pasteurizer comprising a first heat exchanger, a filling station for filling the liquids into containers, and a cooling tunnel consisting of a plurality of cooling cells for cooling the filled containers by means of a cooling liquid. The liquids are heated in the flash pasteurizer prior to filling them into containers in the filling station by supplying thermal energy of the cooling liquid of the cooling tunnel heated during the cooling process to the flash pasteurizer by means of a separate heat pump.

EP 3 057 442 B1 discloses a method for preheating a food product in a hot-filling plant, having a heater for heating the food product to a filling temperature, a preheater upstream of the heater for preheating the food product, a filler for filling the food product into containers, a cooling tunnel for cooling the hot-filled containers with a coolant which is conducted in a coolant circuit via the preheater and the cooling tunnel with the preheater which supplies thermal energy of the coolant of the cooling tunnel heated during the cooling of the containers to the food product, with a separate heat pump which uses the residual thermal energy of the coolant flowing off from the preheater on the primary side to further increase the temperature of the preheated food product with a heat transfer medium that is conducted via the heat pump in a heat transfer medium circuit on the secondary side. The heat transfer medium circuit is conducted via a second preheater for the food product downstream of the first preheater and upstream of the heater. In the second preheater, further preheating of the food product to a temperature below the filling temperature is accomplished with the thermal energy provided by the heat pump on the secondary side by means of the heat transfer medium. In FIG. 1, a schematic view of a device for hot-filling a liquid product is represented which reflects the disclosure of this prior art.

BRIEF DESCRIPTION OF THE DRAWINGS

The included figures represent, by way of example, aspects of embodiments of the invention for a better understanding and for illustrating the invention. In the drawings.

DETAILED DESCRIPTION

Figure 1:
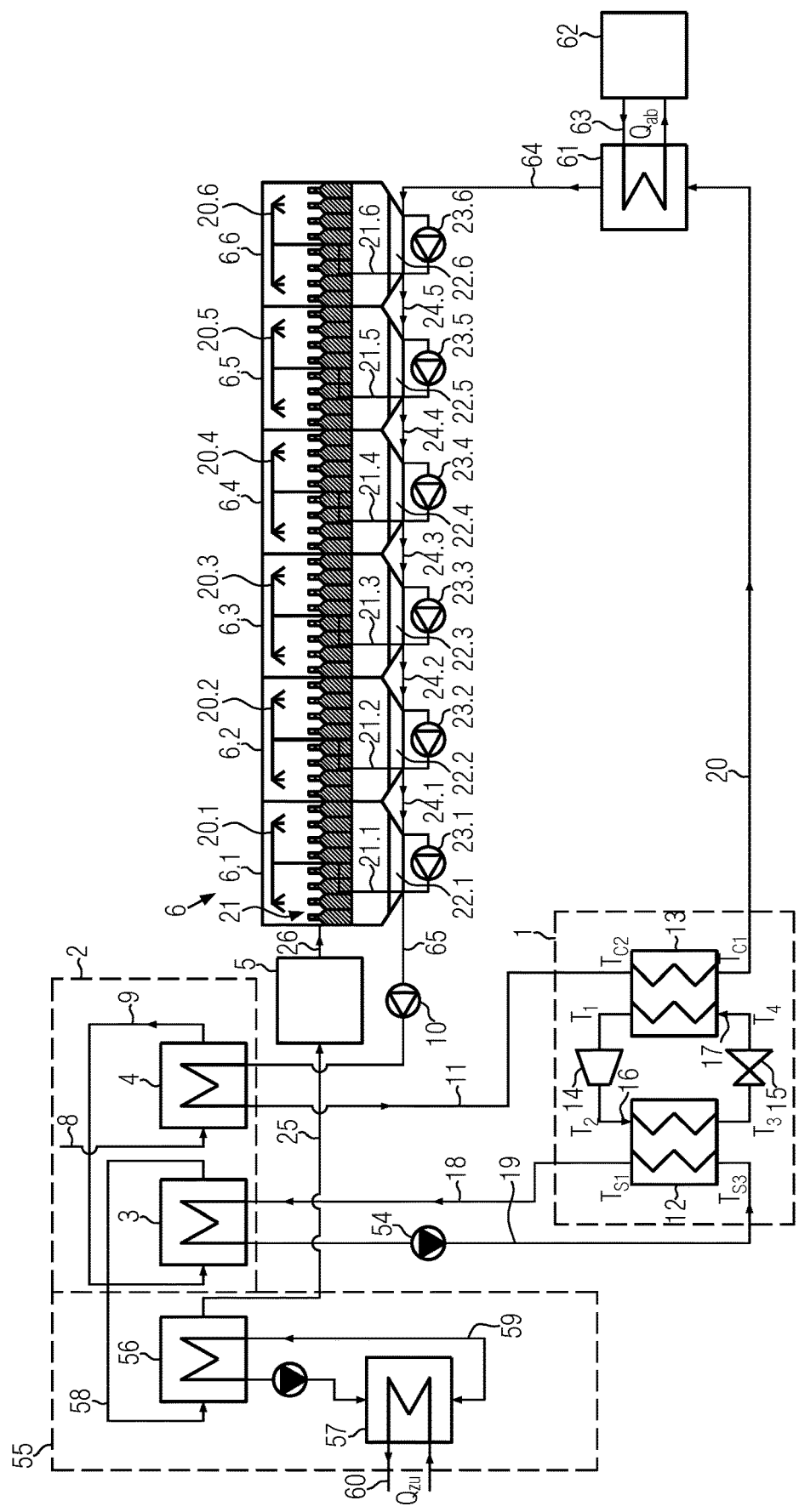
FIG. 1 shows a device for hot-filling a liquid product according to prior art.

It is the object of aspects of the present invention to provide a method and a device for hot-filling a liquid product which permit an effective heat pump and an economic heating to be able to heat the liquid product to a pasteurization temperature.

Embodiments of the invention relate to a method for hot-filling a liquid product, for example juices, with a flash pasteurizer comprising a first heat exchanger and a second heat exchanger, a filling station for filling the product into containers, for example bottles, a cooling tunnel comprising a plurality of cooling cells for cooling the filled containers by means of a coolant, for example water, and a heat pump. Before the product is filled into the containers, it is heated to a target temperature, for example a filling temperature, in the flash pasteurizer. At least a part of the coolant is conducted from the cooling tunnel to and through the first heat exchanger, so that at least a part of the thermal energy of the coolant can be initially transferred to the product by means of the first heat exchanger. The product is then conducted from the first to the second heat exchanger, where at least a further part of the thermal energy is transferable to the second heat exchanger by means of the heat pump using a heat transfer medium in order to further heat the product to the target temperature. The heat transfer medium which circulates through the second heat exchanger and the heat pump is additionally heated by a heater arranged between the heat pump and the second heat exchanger in the direction of circulation.

In methods according to embodiments of the invention, the product, for example drink juice, is heated in the flash pasteurizer already before it is filled. To this end, the thermal energy from the coolant which heats up in the cooling cells of the cooling tunnel during the cooling process is supplied to the flash pasteurizer by means of the heat pump. To be able to reach a higher temperature level in the secondary circuit, the additional heater is provided between the heat pump and the second heat exchanger. For this rise of the temperature level, a quantity of heat can be supplied by the heater which is, for example, provided via vapor or pressurized hot water. Since the heater is provided in the secondary circuit, a vapor heating device, feedlines and discharge lines of the vapor or the pressurized hot water can be manufactured at lower costs than if a heater is provided in the primary circuit. If, however, the heater was provided in the primary circuit, by the direct contact with the product, clearly higher demands would be made on the heater and on corresponding pipelines. Moreover, the heating medium vapor could not be directly applied to this heat exchanger, so that a further heat exchanger circuit would have to be inserted between the medium-contacting heat exchanger and the heating medium vapor.

The thermal energy supplied by the heat pump can be transferred to the product by means of the second heat exchanger in order to heat it. Thereby, the thermal energy supplied by the heat pump, for example by means of the heat transfer medium such as water, can be transferred to the product to be heated in the second heat exchanger. After the heat exchange, the heat transfer medium which is now cooler due to the first heat exchange can be returned again to the heat pump.

In order to heat the product before the filling process, the first heat exchanger can be provided in series with the heat pump such that the coolant from the cooling tunnel reaches the first heat exchanger, and then the heat pump. That means, with respect to the heating of the product before the filling process, the first heat exchanger can be provided in series, that means serially, with the heat pump. That means, the serial connection of the first heat exchanger with the heat pump in view of the heating of the product can permit to increase the temperature level in the heat pump and thus improve the coefficient of performance of the heat pump. For example, for heating the product to be filled, two steps are carried out: the heat transfer by means of the first heat exchanger in particular for thermal energies from the cooling tunnel which can be directly transferred to the product, and subsequently the increase of the energy level to the target temperature provided for the preheating of the product by means of the heat pump.

As an alternative, in order to heat the product prior to the filling process, the first heat exchanger can be provided parallel to the heat pump such that at least a part of the coolant reaches the first heat exchanger from the cooling tunnel, and at least a further part of the coolant reaches the heat pump from the cooling tunnel. That means, with respect to the heating of the product prior to the filling process, the first heat exchanger can be provided parallel to the heat pump. Corresponding to the parallel connection of the heat pump and the first heat exchanger with respect to the heating of the product, a first cascade of cooling cells for a direct heat transfer through the first heat exchanger can be used, for example. The coolant is, for example, returned to the cooling cells after the heat exchange in the first heat exchanger. A second, parallel cascade of cooling cells is connected, for example, with the heat pump, for example additionally by means of a simple pump, whereby the energy level of the thermal energy of the second cascade can be increased, so that this energy level can be raised to the target temperature in order to heat the product to be filled.

The target temperature can be a filling temperature which can, for example, depend on the product.

Here, the part of the coolant that reaches the first heat exchanger can be warmer than the part of the coolant that can reach the heat pump. For example, the temperature in the group of the first cooling cells, which are arranged, for example, sequentially, is higher than in the group of the second cooling cells which are also arranged sequentially, for example. By the parallel connection of the first heat exchanger corresponding to the first cascade and the heat pump corresponding to the second cascade, an even higher energy level and thus a higher coefficient of performance of the heat pump can be achieved. The control of the device according to the invention as described above and below can be accomplished, for example, with a suited control unit, for example a computer.

A device for carrying out the method for hot-filling a liquid product, in particular juices, in embodiments comprises a flash pasteurizer comprising a first heat exchanger and a second heat exchanger, wherein in the flash pasteurizer, the product flows through the first and second heat exchangers, a filling station for filling the product into containers, for example bottles, a cooling tunnel comprising a plurality of cooling cells, and a heat pump. Moreover, the device in embodiments comprises a heater which is designed to heat a heat transfer medium circulating through the second heat exchanger and the heat pump, wherein the heater is arranged between the heat pump and the second heat exchanger in the direction of circulation.

The method for hot-filling a liquid product is meant to be one of the methods as described above or below.

The flash pasteurizer, the filling station, the heat pump, and the cooling tunnel can each be designed separately. Each one of these elements can be respectively designed separately from the other elements of the device. The connections of the elements can be provided by suited conveying and/or transport elements, for example pipes for the transport of the product or other liquids which can serve as auxiliary liquids for the heat transfer, as well as conveyor belts or transport means for containers.

The first heat exchanger can comprise a plate heat exchanger or a tubular heat exchanger. That means, common heat exchanger types can be used to transfer the thermal energy supplied by the heat pump to the product to be heated.

The heat pump can comprise a compression heat pump, for example an electrically driven compression heat pump, an ammonia heat pump, or a heat pump with a transcritical $CO_2$ process. That means, common types of heat pumps can be employed, in particular also those where ammonia or $CO_2$ is employed as a coolant. The latter permits the use of particularly energy-efficient heat pumps, wherein coolants, such as nitrogen or halogen alkanes, can be simultaneously omitted, where the latter might be undesired in filling plants, and halogen alkanes can moreover be undesired due to their property as gases that are harmful to the climate.

The heat pump can be provided between one of the cooling cells of the cooling tunnel and the first heat exchanger. That means, the heat pump can be provided between the multi-cell cooling tunnel and the heat exchanger. Here, the heated coolant can be pumped from the cooling tunnel to the heat pump by means of a simple pump, for example. After the heat exchange, the then cooler coolant is returned again to the cooling tunnel, for example again with an additional pump.

The cooling cells can be interconnected such that the coolant can flow from one cooling cell into one or more adjacent cooling cells, for example from a cooler cooling cell into a warmer cooling cell. After the filling process, the filled and closed containers pass through the cooling tunnel with several similar or equal cooling cells. The cooling cells typically differ by the temperatures prevailing in each of the cooling cells.

Each one of the cooling cells can comprise an irrigation device to spray the coolant onto the containers. That means, the containers to be cooled are irrigated/sprayed with water, for example. Thereby, a heat exchange between the coolant/water and the product filled in the containers can take place.

The cooling liquid can be collected, for example separately for each cooling cell. In general, a temperature gradient from the first to the last one of the plurality of cooling cells can occur, wherein, for example, the first cooling cell is the warmest one, and the last cooling cell is the coldest cooling cell. The storage basins for the coolant of the cooling cells can be, for example, interconnected so that coolant can flow from one cooling cell into an adjacent cooling cell and be there optionally also employed again for irrigation.

The heat pump can be provided between the cooling cell having the highest temperature of the heated coolant and the first heat exchanger. For example, this is the first cooling cell of the cooling tunnel.

Between the heat pump and a coldest cooling cell of the plurality of cooling cells, a third heat exchanger can be provided. The third heat exchanger can be connected, for example, to a cooling tower on the primary side via a pipeline and be designed to cool down the coolant to the coolant temperature required at the cooling tunnel by dissipating a quantity of heat $Q_{ab}$. Instead of the cooling tower, other sources of cold, such as, for example, refrigeration plants or cold water tanks on the client's side, can be provided. From the third heat exchanger, the coolant can be returned again to the cooling tunnel or to a cooling cell via a conduit.

Turning now to the figures, FIG. 1 shows a device for hot-filling a liquid product according to prior art. The device comprises a heat pump 1, a preheating stage 2 of a flash pasteurizer comprising a first heat exchanger 4 and a second heat exchanger 3 as a preheater, a filling station 5, a cooling tunnel 6, and a heater 7. The heat pump 1 and the first heat exchanger 4 are provided serially.

Via a product feedline 8, the liquid product is conducted to the first heat exchanger 4. The product flows through the first heat exchanger 4, where heated coolant, for example water from the cooling tunnel 6, is used to heat the product in the first heat exchanger 4, in a countercurrent, to a temperature which is yet below a target temperature, for example a filling temperature. Thus, preheating can take place. The heated coolant is to this end pumped out of the cooling tunnel 6 via a conduit 65 and a pump 10 to and through the first heat exchanger 4. There, the heated coolant is used, for example, to heat the product in a first step, i.e. for energies that can be directly transferred. That means, already by means of the first heat exchanger 4, the product supplied via the feedline 8 is heated.

Upon heating in the first heat exchanger 4, the heated product is forwarded to the second heat exchanger 3. The coolant whose temperature level slightly cooled down due to the use in the first heat exchanger 4 is conducted from the first heat exchanger 4 by means of the feedline 11 to the heat pump 1, and there to a second heat pump element 13.

The heat pump 1 comprises the first heat pump element 12 for heat emission, the second heat pump element 13 for heat absorption, and a compressor 14 and a throttle 15. Reference numerals 16 and 17 designate the direction of flow within the heat pump 1. The temperature $T_{c2}$ of the coolant when it enters the second heat pump element 13 can be approximately 30 to 32° C. When it exits from the second heat pump element 13, the temperature $T_{c1}$ of the coolant can be approximately 16° C.

Within the heat pump 1, the temperature $T_1$ can be approximately 28° C., the temperature $T_2$ approximately 96° C., the temperature $T_3$ approximately 28° C., and the temperature $T_4$ approximately 27° C.

Figure 2:
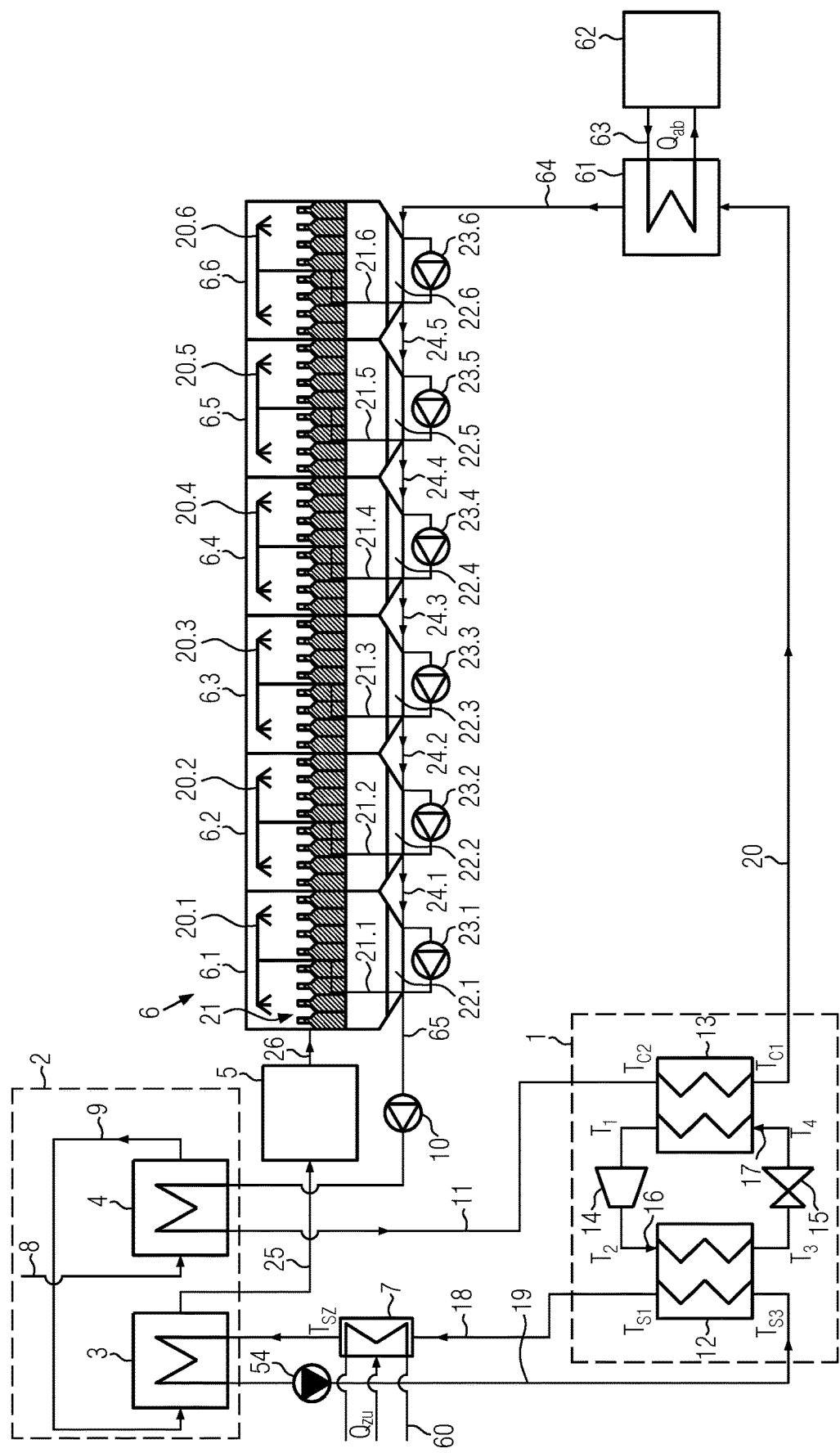
FIG. 2 shows a first embodiment of a device for hot-filling a liquid product with a heat pump and a flash pasteurizer, wherein the heat pump and a second heat exchanger of the flash pasteurizer are provided serially.

The coolant that already cooled down after having passed the second heat pump element 13 is conducted to a third heat exchanger 61 via a conduit 20. The third heat exchanger 61 is connected to a cooling tunnel 62, for example, on the primary side via the pipeline 63 and cools the coolant to the coolant temperature required at the cooling tunnel 62 by dissipating a quantity of heat $Q_{ab}$. From the third heat exchanger 61, the coolant is returned again to the cooling tunnel 6 via the conduit 64. The cooling tunnel 6 consists of six cooling cells 6.1, 6.2, 6.3, 6.4, 6.5, 6.6. Here, as is shown in FIG. 2 by way of example, the coolant is conducted to the coldest one of the exemplary six cells 6.1-6.6 of the cooling tunnel 6, that is to cell 6.6. The filled containers 21 pass through the cooling cells 6.1-6.6 which are, for example, directly adjacent, with the aid of a suited transport medium (not shown herein).

The cooling cells 6.1-6.6 furthermore comprise irrigation devices 20.1, 20.2, 20.3, 20.4, 20.5, 20.6 which are represented schematically. These are used to irrigate the closed containers 21 to be cooled with the coolant to thus cool them down. The coolant is forwarded to the irrigation devices 20.1-20.6 through coolant feedlines 21.1, 21.2, 21.3, 21.4, 21.5, 21.6. In the process, the coolant used can be collected by coolant basins 22.1, 22.2, 22.3, 22.4, 22.5, 22.6, and from the coolant basins 22.2-22.6, at least a part of the coolant can be each used again for irrigation by means of pumps 23.1, 23.2, 23.3, 23.4, 23.5, 23.6. The coolant basins 22.1-22.6 are each arranged adjacently, so that at least two adjacent cooling cells 6.1-6.6 can be connected by suited conduits 24.1, 24.2, 24.3, 24.4, 24.5.

After heating in the first heat exchanger 4, the heated product is forwarded to the second heat exchanger 3 via a conduit 9 and can there be further heated. The two heat exchangers 3, 4 are provided, for example, in series in the flash pasteurizer 2. The two heat exchangers 3, 4 are serially connected via the conduit 9.

The further heating of the product in the second heat exchanger 3 is accomplished by heat emission of a heat transfer medium, for example water, which circulates through the second heat exchanger 3 and the first heat pump element 12. From the first heat pump element 12, the heat transfer medium is returned to the second heat exchanger 3 with a temperature $T_{S1}$ via a conduit 18.

After having exited from the second heat exchanger 3, the heat transfer medium cooled down to a temperature $T_{S3}$ of 35° C. to 40° C. is returned again to the first heat pump element 12.

After having passed through the second heat exchanger 3, the product is conducted to a fourth heat exchanger 56 via a feedline 58 and can there be heated to the target temperature, for example the filling temperature, to be then conducted to the filling station 5 via a suited conduit system 25. After the filling process and a closing of the containers 21 into which the heated product has been filled, the transport of the containers 21 to the cooling tunnel 6 can be accomplished via a suited transport section 26. The use of the heated coolant from the cooling tower 6 is also provided serially. That means, the first heat exchanger 4 is provided serially to the heat pump 1 with respect to heating. The heating of the product to the target temperature in the fourth heat exchanger 56 is accomplished by heat emission of a heat transfer medium, for example water, which is conducted through a fifth heat exchanger 57 and absorbs heat therein. For this heating, a quantity of heat $Q_{zu}$ is supplied through the heat exchanger 57 by means of a conduit 60, the quantity of heat $Q_{zu}$ being provided, for example, via vapor or pressurized hot water.

The main heating stage of the flash pasteurizer is marked with reference numeral 55.

FIG. 2 shows a first embodiment of a device for hot-filling a liquid product with a heat pump 1, a flash pasteurizer 2 comprising a first heat exchanger 4 and a second heat exchanger 3, a filling station 5, a cooling tunnel 6, and a heater 7. The heat pump 1 and the first heat exchanger 4 are provided serially.

Compared to the prior art of FIG. 1, the first heat exchanger 4 still operates as a preheater in the first embodiment, while the second heat exchanger 3 takes over the function of a main heating stage of the flash pasteurizer 2.

Via a product feedline 8, the liquid product, i.e. a liquid to be heated and cooled down again after the filling process, for example a juice beverage, is conducted to the first heat exchanger 4. The product flows through the first heat exchanger 4, where heated coolant, for example water from the cooling tunnel 6, is used to heat the product in the first heat exchanger 4, in a countercurrent, to a temperature which is yet below a target temperature, for example a filling temperature. Thus, preheating can take place. The heated coolant is to this end pumped out of the cooling tunnel 6 via a conduit 65 and a pump 10 to and through the first heat exchanger 4. There, the heated coolant is used, for example, to heat the product in a first step, i.e. for energies that can be directly transferred. That means, already by means of the first heat exchanger 4, the product supplied via the feedline 8 is heated.

Upon heating in the first heat exchanger 4, the heated product is forwarded to the second heat exchanger 3. The coolant whose temperature level slightly cooled down due to its use in the first heat exchanger 4 is conducted from the first heat exchanger 4 by means of the feedline 11 to the heat pump 1, and there to a second heat pump element 13.

The heat pump 1 comprises the first heat pump element 12 for heat emission, the second heat pump element 13 for heat absorption, and a compressor 14 and a throttle 15. Reference numerals 16 and 17 designate the direction of flow within the heat pump 1. The temperature $T_{c2}$ of the coolant when it enters the second heat pump element 13 can be approximately 30 to 32° C., other temperatures are also possible. When it exits from the second heat pump element 13, the temperature $T_{c1}$ of the coolant can be approximately 16° C., however, other temperatures are also possible, depending on the machine design, the length of the machine, insulation etc.

Within the heat pump 1, the temperature $T_1$ can be approximately 28° C., the temperature $T_2$ approximately 96° C., the temperature $T_3$ approximately 28° C., and the temperature $T_4$ approximately 27° C. Here, these temperature indications are to be understood merely as an example, and other temperature indications are also possible, depending on the design of the heat pump 1, its coefficient of performance, the supplied electric energy, and other parameters corresponding to the design of the machine.

In embodiments, the coolant that already cooled down after having passed the second heat pump element 13 is conducted to a third heat exchanger 61 via a conduit 20. The third heat exchanger 61 is connected to a cooling tower 62, for example, on the primary side via the pipeline 63 and cools the coolant to the coolant temperature required at the cooling tunnel by dissipating a quantity of heat $Q_{ab}$. Instead of the cooling tower 62, however, other sources of cold, such as, for example, refrigeration plants or cold water tanks on the client's side, are also possible. From the third heat exchanger 61, the coolant is returned again to the cooling tunnel 6 via the conduit 64. The cooling tunnel in some embodiments 6 consists of six cooling cells 6.1, 6.2, 6.3, 6.4, 6.5, 6.6. Here, as is shown in FIG. 2 by way of example, the coolant is conducted to the coldest one of the exemplary six cells 6.1-6.6 of the cooling tunnel 6, that is to cell 6.6. The filled containers 21 pass through the cooling cells 6.1-6.6 which are, for example, directly adjacent, with the aid of a suited transport medium (not shown herein). Here, the filled containers 21, for example bottles, can be directly conducted from the one to the other cooling cell 6.1-6.6.

The cooling cells 6.1-6.6 furthermore comprise irrigation devices 20.1, 20.2, 20.3, 20.4, 20.5, 20.6 which are represented schematically. These are used to irrigate the closed containers 21 to be cooled with the coolant to thus cool them down. The coolant is forwarded to the irrigation devices 20.1-20.6 through coolant feedlines 21.1, 21.2, 21.3, 21.4, 21.5, 21.6. In the process, the coolant used can be collected by coolant basins 22.1, 22.2, 22.3, 22.4, 22.5, 22.6, and from the coolant basins 22.2-22.6, at least a part of the coolant can be each used again for irrigation by means of pumps 23.1, 23.2, 23.3, 23.4, 23.5, 23.6. Furthermore, fresh, for example cooler, coolant, for example water, can be supplied (not shown herein). The coolant basins 22.1-22.6 are each arranged adjacently, so that at least two adjacent cooling cells 6.1-6.6 can be connected by suited conduits 24.1, 24.2, 24.3, 24.4, 24.5.

After the heating process in the first heat exchanger 4, the heated product may be forwarded to the second heat exchanger 3 via a conduit 9 and can there be further heated to the target temperature, for example, the filling temperature. The target temperature can be 80 to 90° C., depending on the target temperature provided for the product. The two heat exchangers 3, 4 are provided, for example, in series in the flash pasteurizer 2. The two heat exchangers 3, 4 are serially connected via the conduit 9.

The heating of the product to the target temperature in the second heat exchanger 3 is accomplished by heat emission of a heat transfer medium, for example water, which circulates through the second heat exchanger 3 and the first heat pump element 12. From the first heat pump element 12, the heat transfer medium with a temperature $T_{S1}$ of 50° C. to 60° C. is conducted, via a feedline 18, to and through a heater 7 in which the heat transfer medium is heated to a higher temperature $T_{S2}$ of 80° C. to 90° C. For this heating, a quantity of heat $Q_{zu}$ is supplied through the heater 7 by means of a conduit 60, the quantity of heat $Q_{zu}$ being provided, for example, via vapor or pressurized hot water.

After having exited from the second heat exchanger 3, the heat transfer medium cooled down to a temperature $T_{S3}$ of 35° C. to 40° C. is returned again to the first heat pump element 12.

The use of the heat pump 1 separately from the cooling tunnel 6, the flash pasteurizer 2, and the filling station 5 permits, together with the heater 7, a higher degree of utilization of the recovery of thermal energy, and the use of the heat pump 1 simultaneously permits cooling or else heating at very low costs.

After having passed the second heat exchanger 3, the product is conducted to the filling station 5 via a suited conduction system 25. The filling station 5 can comprise a suited device for hot-filling the product into containers 21, for example bottles, as is known in prior art. Within the filling station 5, the containers 21 are typically closed. After the filling process and a closing of the containers 21 into which the heated product has been filled, the transport of the containers 21 to the cooling tunnel 6 can be accomplished via a suited transport section 26. The use of the heated coolant from the cooling tower 6 is also provided serially. That means, the first heat exchanger 4 is provided serially to the heat pump 1 with respect to heating.

Figure 3:
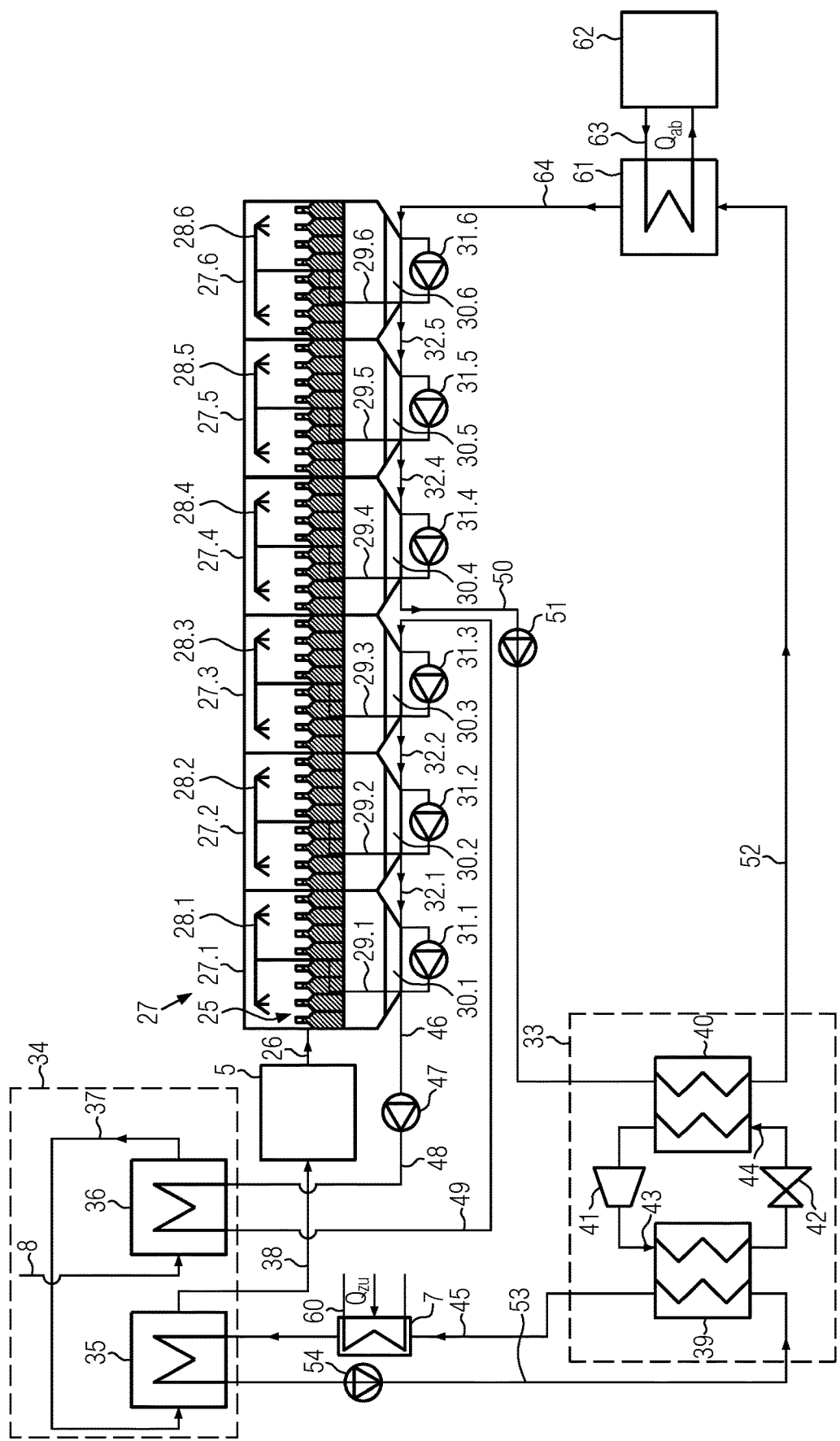
FIG. 3 shows a second embodiment of a device for hot-filling a liquid product with a heat pump and a flash pasteurizer, wherein the heat pump and a second heat exchanger of the flash pasteurizer are provided in parallel.

FIG. 3 shows a second embodiment of a device for hot-filling a liquid product with a heat pump 33, a flash pasteurizer 34 comprising a first heat exchanger 36 and a second heat exchanger 35, a filling station 5, a cooling tunnel 27, and a heater 7. The first heat exchanger 36 is provided parallel to the heat pump 33 in view of the heating of the product. A cooling tunnel 27 is shown which is similar to the cooling tunnel 6 shown in FIG. 2, but is different in that groups of cooling cells of the cooling tunnel can conduct the coolant withdrawn from it to the first heat exchanger 36 or to a second heat pump element 40 of the heat pump 33.

Compared to the prior art of FIG. 1, the first heat exchanger 36 still operates as a preheater in the second embodiment, while the second heat exchanger 35 takes over the function of a main heating stage of the flash pasteurizer 2.

The cooling tunnel 27 comprises six cooling cells 27.1-27.6 shown by way of example. These cooling cells comprise irrigation devices 28.1, 28.2, 28.3, 28.4, 28.5, 28.6 which are shown with two arms merely schematically. The irrigation devices 28.1-28.6 obtain the coolant used for irrigation, for example water, via feedlines 29.1, 29.2, 29.3, 29.4, 29.5, 29.6. The coolant dripping off or leaking from the containers 21 after irrigation is collected in respective coolant basins 30.1, 30.2, 30.3, 30.4, 30.5, 30.6 of the respective cooling cells 27.1-27.6. The collected coolant can be reused for irrigation at least partially via pumps 31.1, 31.2, 31.3, 31.4, 31.5, 31.6. Here, cooler coolant from other feed sources can also be used which is not shown herein. Furthermore, cooler coolant which flows back from the heat pump 33 can be supplied to the cooling cells 27.4, 27.5, 27.6.

The coolant basins 30.1-30.6 are each arranged adjacently in embodiments, so that the first three cooling cells 27.1, 27.2, 27.3 can be connected by suited conduits 32.1, 32.2, and the last three cooling cells 27.4, 27.5, 27.6 by suited conduits 32.3, 32.4. Via a product feedline 8, the product, i.e. a liquid to be heated and cooled down again after the filling process, for example a juice beverage, is conducted to the second heat exchanger 36. The first heat exchanger 36 is connected to the second heat exchanger 35 via a conduit 37, wherein the heat exchangers 35, 36 are provided, for example, serially within the flash pasteurizer 34. In the first heat exchanger 36, the product supplied through the conduit 8 is heated to a temperature which is below a target temperature, for example, a filling temperature. The heated product is then supplied to the second heat exchanger 35 for further heating it to the target temperature.

After the heating to the target temperature, the product is supplied to the filling station 5 via a conduit 38. The filling station 5 corresponds to the filling stations already described above in connection with FIG. 1. Again, reference numeral 26 indicates merely schematically that the filled and closed containers 21 can be forwarded to the cooling tunnel 27. Here, the filling station 5 and the cooling tunnel 27 can be provided spatially separated from each other. The same applies to the flash pasteurizer 34 with the two heat exchangers 35, 36.

FIG. 3 furthermore shows the heat pump 33 which is provided with a first heat pump element 39 for heat emission, and the second heat pump element 40 for heat absorption. Between the second heat pump element 40 and the first heat pump element 39, a compressor 41 and, on the opposite side, a throttle 42 are provided. Reference numerals 43 and 44 designate the direction of flow within the internal circuit of the heat pump 33.

The heating of the product to the target temperature in the second heat exchanger 35 is accomplished by heat emission of a heat transfer medium, for example water, which circulates through the second heat exchanger 35 and the first heat pump element 39. From the first heat pump element 39, the heat transfer medium is conducted, via a feedline 45, to and through a heater 7 in which the heat transfer medium is heated to a higher temperature. For this heating, a quantity of heat $Q_{zu}$ is supplied through the heater 7 by means of a conduit 60, the quantity of heat $Q_{zu}$ being provided, for example, via vapor or pressurized hot water.

After having exited from the second heat exchanger 35, the cooled down heat transfer medium is returned again to the first heat pump element 39 via a pump 54 and a feedline 53.

In the further development shown in FIG. 3, a first cascade, for example comprising a group of three cooling cells 27.1, 27.2, 27.3, is connected to the first heat exchanger 36, any other grouping being possible. That means, the heated coolant from this group, typically withdrawn from the warmest coolant basin 30.1, is conducted via a feedline 46, a pump 47, and a further feedline 48, to the first heat exchanger 36 to transfer energy from the first cascade to the product. Via a return line 49, the coolant is returned back to the group of three cooling cells 27.1, 27.2, 27.3 after heat transfer has taken place.

FIG. 3 shows a further group which consists, by way of example, of three cooling cells 27.4, 27.5, 27.6, where, however, a different grouping is possible. Here, from the warmest one of the second cascade, consisting of the cells 27.4, 27.5, 27.6, i.e. from cell 27.4 and its coolant basin 30.4, coolant is conducted via a feedline 50 and a pump 51 to the heat pump 33, i.e. to the second heat pump element 40. After the transfer of the heat from the coolant which is conducted through the second heat pump element 40, the now cooler coolant is conducted to a third heat exchanger 61 via the feedline 52. The third heat exchanger 61 is connected to a cooling tower 62, for example, on the primary side via the pipeline 63 and cools the coolant to the coolant temperature required at the cooling tunnel by dissipating a quantity of heat $Q_{ab}$. Instead of the cooling tower 62, however, other sources of cold, such as, for example, refrigeration plants or cold water tanks on the client's side, are also possible. From the third heat exchanger 61, the coolant is returned again, via the conduit 64, to the cooling cell with reference numeral 27.6, that means the coldest one of the second group. By the parallel heating of the product by means of the first heat exchanger 36 and the heat pump 33 provided herein, an efficient product preheating can be achieved.

For the devices represented in FIGS. 2 and 3, the heating and cooling of the product can be controlled by a suited computer control which is not shown herein.

It will be understood that the shown devices can analogously also be used for a selective cooling of product towards low temperatures.

It will be understood that features mentioned in the above-described example embodiments are not restricted to the combinations especially shown in the figures but can also be possible in any other combinations.

What is claimed is:

1. A method for hot-filling a liquid product using a flash pasteurizer comprising a first heat exchanger, a second heat exchanger, a filling station for filling the liquid product into containers, a cooling tunnel comprising a plurality of cooling cells that cool filled containers by means of a coolant, a heat pump, and a third heat exchanger being provided between the heat pump and one coldest cooling cell of the plurality of cooling cells, the method comprising:

heating the liquid product, before it is filled into the containers to a target temperature in the flash pasteurizer, wherein at least a part of the coolant is conducted from the cooling tunnel to and through the first heat exchanger, so that at least a part of thermal energy of the coolant is transferred initially to the liquid product by the first heat exchanger;

conducting the liquid product from the first heat exchanger to the second heat exchanger, wherein at least a further part of the thermal energy of the coolant is transferred to the second heat exchanger by the heat pump through a heat transfer medium in order to further heat the liquid product to the target temperature; and wherein the heat transfer medium which circulates through the second heat exchanger and the heat pump is additionally heated by a heater arranged between the heat pump and the second heat exchanger in a direction of circulation of the heat transfer medium, wherein the coolant that already cooled down after having passed a second heat pump element is conducted to the third heat exchanger via a conduit, wherein the third heat exchanger cools the coolant to a coolant temperature required at the cooling tunnel by dissipating a quantity of heat, and wherein from the third heat exchanger, the coolant is returned again to the cooling tunnel via a conduit to one coldest cooling cell of the plurality of cooling cells.

2. The method according to claim 1, wherein for heating the liquid product before filling the liquid product into the containers, the first heat exchanger is provided in series with the heat pump such that the coolant reaches the first heat exchanger from the cooling tunnel and then the heat pump.

3. The method according to claim 1, wherein, for heating the liquid product prior to filling the liquid product into the containers, the first heat exchanger is provided parallel to the heat pump such that at least some of the coolant reaches the first heat exchanger from the cooling tunnel, and at least a further part of the coolant reaches the heat pump from the cooling tunnel.

4. The method according to claim 3, wherein the part of the coolant that reaches the first heat exchanger is warmer than the part of the coolant that reaches the heat pump.

5. The method of claim 1, wherein the liquid product comprises juice.

6. The method of claim 1, wherein the coolant comprises water.

7. A device for carrying out a method for hot-filling a liquid product, the device comprising:
a flash pasteurizer, comprising:
a first heat exchanger;
a second heat exchanger;
a filling station for filling the liquid product into containers;
a cooling tunnel comprising a plurality of cooling cells that cool filled containers by means of a coolant;
a heat pump; and
a heater designed to heat a heat transfer medium circulating through the second heat exchanger and the heat pump, wherein the heater is arranged between the heat pump and the second heat exchanger in a direction of circulation of the heat transfer medium;
wherein in the flash pasteurizer, the liquid product flows through the first heat exchanger, the second heat exchanger, and the filling station;
wherein the device is configured to heat the liquid product, before it is filled into the containers, to a target temperature in the flash pasteurizer, wherein at least a part of the coolant is to be conducted from the cooling tunnel to and through the first heat exchanger, so that at least a part of thermal energy of the coolant is transferred initially to the liquid product by the first heat exchanger; and
wherein the device is further configured to conduct the liquid product from the first heat exchanger to the second heat exchanger, wherein at least a further part of the thermal energy of the coolant is to be transferred to the second heat exchanger by the heat pump through the heat transfer medium in order to further heat the liquid product to the target temperature, and
wherein a third heat exchanger is provided between the heat pump and one coldest cooling cell of the plurality of cooling cells.

8. The device according to claim 7, wherein the flash pasteurizer, the filling station, the heat pump, and the cooling tunnel are each designed separately.

9. The device according to claim 7, wherein the second heat exchanger comprises a plate heat exchanger or a tubular heat exchanger.

10. The device according to claim 7, wherein the heat pump comprises a compression heat pump, an ammonia heat pump, or a heat pump with a transcritical $CO_2$ process.

11. The device according to claim 10, wherein the compression heat pump is an electrically driven compression heat pump.

12. The device according to claim 7, wherein the heat pump is provided between one of the cooling cells of the cooling tunnel and the first heat exchanger.

13. The device according to claim 12, wherein the heat pump is provided between the cooling cell having a highest temperature of the heated coolant and the first heat exchanger.

14. The device according to claim 7, wherein the cooling cells are interconnected such that the coolant can be pumped from one cooling cell into one or more adjacent cooling cells.

15. The device according to claim 7, wherein each one of the cooling cells comprises an irrigation plant in order to spray the containers with the coolant.

16. The device according to claim 7, wherein the liquid product comprises juice.

17. The device according to claim 7, wherein for heating the liquid product before filling the liquid product into the containers, the first heat exchanger is provided in series with the heat pump such that the coolant reaches the first heat exchanger from the cooling tunnel and then the heat pump.

18. The device according to claim 7, wherein, for heating the liquid product prior to filling the liquid product into the containers, the first heat exchanger is provided parallel to the heat pump such that at least some of the coolant reaches the first heat exchanger from the cooling tunnel, and at least a further part of the coolant reaches the heat pump from the cooling tunnel.

19. The device according to claim 18, wherein device is configured such that the part of the coolant that reaches the first heat exchanger is warmer than the part of the coolant that reaches the heat pump.

\* \* \* \* \*